(12) United States Patent
Guo (10) Patent No.: US 11,232,317 B2
(45) Date of Patent: Jan. 25, 2022

(54) FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventor: Yiping Guo, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 27 days.

(21) Appl. No.: 16/825,604

(22) Filed: Mar. 20, 2020

(65) Prior Publication Data

US 2020/0218920 A1    Jul. 9, 2020

Related U.S. Application Data

(63) Continuation-in-part of application No. PCT/CN2018/125425, filed on Dec. 29, 2018.

(51) Int. Cl.
*G06K 9/20* (2006.01)
*G06K 9/00* (2006.01)

(52) U.S. Cl.
CPC ......... *G06K 9/209* (2013.01); *G06K 9/00013* (2013.01)

(58) Field of Classification Search
CPC ................................................ G06K 9/00013
See application file for complete search history.

(56) References Cited

U.S. PATENT DOCUMENTS

| | | |
|---|---|---|
| 2005/0179368 A1 | 8/2005 | Ryu et al. |
| 2014/0181962 A1 | 6/2014 | Seo et al. |
| 2015/0334859 A1 | 11/2015 | Lee et al. |

(Continued)

FOREIGN PATENT DOCUMENTS

| | | |
|---|---|---|
| CN | 104182727 A | 12/2014 |
| CN | 105489591 A | 4/2016 |

(Continued)

OTHER PUBLICATIONS

JungHo Jin et al.: "Rollable Transparent Glass-Fabric Reinforced Composite Substrate for Flexible Devices," Advanced Materials, 22(40), 4510-4515. doi:10.1002/adma.201002198, Oct. 25, 2010, 6 pages.

(Continued)

*Primary Examiner* — Utpal D Shah
(74) *Attorney, Agent, or Firm* — Scully Scott Murphy & Presser (57) ABSTRACT

Provided are a fingerprint identification apparatus and an electronic device. The fingerprint identification apparatus is applied to an electronic device having a display screen, wherein the fingerprint identification apparatus comprises: a support plate; and at least one fingerprint sensor chip, wherein a middle frame of the electronic device is provided with a groove located on an upper surface, and the at least one fingerprint sensor chip is disposed in the groove of the middle frame through the support plate so that the at least one fingerprint sensor chip is located under the display screen of the electronic device. In embodiments of the present application, by the support plate, costs and complexity of an electronic device could be reduced, and maintainability could be improved.

18 Claims, 4 Drawing Sheets

(56) References Cited

U.S. PATENT DOCUMENTS

| | | | |
|---|---|---|---|
| 2017/0118838 A1 | 4/2017 | Williams et al. | |
| 2017/0206644 A1 | 7/2017 | Megginson et al. | |
| 2017/0316248 A1* | 11/2017 | He | G01L 1/142 |
| 2018/0096187 A1 | 4/2018 | Kwon et al. | |
| 2018/0101718 A1* | 4/2018 | Lowe | G06Q 20/34 |
| 2018/0300526 A1 | 10/2018 | Cho et al. | |
| 2018/0322326 A1* | 11/2018 | Li | G06K 9/00053 |
| 2018/0330141 A1 | 11/2018 | Yang et al. | |
| 2018/0343741 A1 | 11/2018 | Williams et al. | |
| 2018/0365472 A1 | 12/2018 | Cai | |
| 2019/0163953 A1* | 5/2019 | Jin | G06K 9/00046 |
| 2020/0218869 A1* | 7/2020 | Han | G06K 9/0002 |

FOREIGN PATENT DOCUMENTS

| | | |
|---|---|---|
| CN | 205334502 U | 6/2016 |
| CN | 105825165 A | 8/2016 |
| CN | 106993072 A | 7/2017 |
| CN | 107066946 A | 8/2017 |
| CN | 107169452 A | 9/2017 |
| CN | 107241468 A | 10/2017 |
| CN | 107305411 A | 10/2017 |
| CN | 107451579 A | 12/2017 |
| CN | 206921061 U | 1/2018 |
| CN | 107910344 A | 4/2018 |
| CN | 107918450 A | 4/2018 |
| CN | 207182349 U | 4/2018 |
| CN | 207557977 U | 6/2018 |
| CN | 108323207 A | 7/2018 |
| CN | 108596080 A | 9/2018 |
| CN | 108615003 A | 10/2018 |
| CN | 208027381 U | 10/2018 |
| CN | 208027382 U | 10/2018 |
| CN | 108734119 A | 11/2018 |
| CN | 108737643 A | 11/2018 |
| CN | 108810207 A | 11/2018 |
| CN | 208156697 U | 11/2018 |
| CN | 108962025 A | 12/2018 |
| CN | 109074492 A | 12/2018 |
| CN | 109075141 A | 12/2018 |
| CN | 208283964 U | 12/2018 |
| CN | 109791610 A | 5/2019 |
| CN | 209297322 U | 8/2019 |
| CN | 209460780 U | 10/2019 |
| EP | 1557891 A2 | 7/2005 |
| KR | 101165087 B1 | 7/2012 |
| TW | 201830281 A | 8/2018 |
| WO | 2018135780 A1 | 7/2018 |
| WO | 2020019263 A1 | 1/2020 |

OTHER PUBLICATIONS

Anonymous:"Filter capacitor Wikipedia," XP055695628, Aug. 19, 2012, retrieved from the Internet:URL:https:jjen.wikipedia.orgjwjindex.php?title=Filter capacitor&oldid=508192042 (retrieved on May 14, 2020), 3 pages.

Yang, G. et al., "Trusted Computing-Based Double Factor Authentication for Mobile Terminals", 2010 International Symposium on Intelligence Information Processing and Trusted Computing, Dec. 10, 2010, pp. 683-685.

Zhou, Y., "Overview of screen lock and unlock technology based on mobile terminals", Scientific and Technological Innovation, Jul. 20, 2018, pp. 67-68 together with English language abstract.

* cited by examiner

FINGERPRINT IDENTIFICATION APPARATUS AND ELECTRONIC DEVICE

CROSS-REFERENCE TO RELATED APPLICATIONS

This application is a continuation-in-part of International Application No. PCT/CN2018/125425, filed on Dec. 29, 2018, the disclosure of which is hereby incorporated by reference in its entirety.

TECHNICAL FIELD

Embodiments of the present application relate to the electronic field, and more particularly, to a fingerprint identification apparatus and an electronic device.

BACKGROUND

At present, an under-screen fingerprint identification solution is to attach an optical fingerprint identification module or an ultrasonic fingerprint identification module to the bottom of an organic light-emitting diode (OLED) screen, that is, either the optical fingerprint identification module or the ultrasonic fingerprint identification module is required to be closely adhered to a light-emitting layer of the bottom of a screen.

However, since the OLED screen is costly and fragile, the OLED screen is easily damaged when the fingerprint identification module is directly attached to the OLED screen. In addition, since the fingerprint identification module and the OLED screen are completely adhered, if the fingerprint identification module is damaged, the OLED screen is easily damaged when the fingerprint identification module is disassembled. Moreover, an attaching process of directly attaching the fingerprint identification module to the OLED screen is also relatively complicated.

Due to the above problems, costs and complexity of an electronic device are greatly increased, and maintainability is low.

SUMMARY

Provided are a fingerprint identification apparatus and an electronic device, which could reduce costs and complexity of the electronic device, and improve maintainability. Especially, in a scenario of a plurality of fingerprint sensor chips, the costs and the complexity of the electronic device could be effectively reduced, and the maintainability is greatly improved.

In a first aspect, provided is a fingerprint identification apparatus applied to an electronic device having a display screen, and in some possible implementation manners, the fingerprint identification apparatus includes:

a support plate; and at least one fingerprint sensor chip, where the at least one fingerprint sensor chip is disposed on an upper surface of the support plate;

where the support plate is configured to be mounted to a middle frame of the electronic device so that the at least one fingerprint sensor chip is located under the display screen of the electronic device; and the at least one fingerprint sensor chip is configured to receive a fingerprint detecting signal returned by reflection or scattering via a human finger on the display screen, where the fingerprint detecting signal is used to detect fingerprint information of the finger.

In some possible implementation manners, the middle frame of the electronic device is provided with a groove located on an upper surface, and the at least one fingerprint sensor chip is disposed in the groove of the middle frame through the support plate.

In some possible implementation manners, the fingerprint identification apparatus further includes:

a circuit board, where at least a part of the circuit board is connected to an edge position of the upper surface of the support plate, and the circuit board and the at least one fingerprint sensor chip are connected.

In some possible implementation manners, the at least a part of the circuit board is connected to the edge position of the upper surface of the support plate that is close to a long side.

In some possible implementation manners, the support plate is a flexible stiffening plate, and the flexible stiffening plate is provided with a first positioning hole in an edge region of a lower surface that is close to a short side.

In some possible implementation manners, the first positioning hole includes two positioning holes, and an opening shape of each positioning hole is circular.

In some possible implementation manners, the at least one fingerprint sensor chip includes a plurality of optical fingerprint sensor chips arranged in a direction of a long side of an upper surface of the flexible stiffening plate, and the flexible stiffening plate is provided with a second positioning hole in an interval region between each pair of adjacent chips of the plurality of optical fingerprint sensor chips.

In some possible implementation manners, an opening shape of the second positioning hole is oblong or elliptical.

In some possible implementation manners, the at least one fingerprint sensor chip includes a plurality of optical fingerprint sensor chips, and the plurality of optical fingerprint sensor chips are arranged on the upper surface of the support plate side by side to be spliced into an optical fingerprint sensor chip component.

In some possible implementation manners, the circuit board is provided with at least one bending groove at one end close to the plurality of optical fingerprint sensor chips, and one of the at least one bending groove corresponds to an interval region between a pair of adjacent chips of the plurality of optical fingerprint sensor chips.

In some possible implementation manners, the bending groove is U-shaped.

In some possible implementation manners, the fingerprint identification apparatus further includes:

a filter, where the filter is disposed on the at least one fingerprint sensor chip.

In some possible implementation manners, a light incident face of the filter is provided with an optical inorganic plating film or an organic blackening coating.

In some possible implementation manners, the filter and the at least one fingerprint sensor chip are fixed in a non-photosensitive region of the at least one fingerprint sensor chip by dispensing, and there is a gap between the filter and a photosensitive region of the at least one fingerprint sensor chip; or a lower surface of the filter is fixed on an upper surface of the at least one fingerprint sensor chip by glue having a refractive index lower than a preset refractive index.

In some possible implementation manners, the circuit board is connected to the at least one fingerprint sensor chip by a gold wire, and a height of the gold wire and a height of a sealing adhesive of the gold wire are lower than a height of the filter, respectively.

In some possible implementation manners, surface roughness of the support plate is greater than 0.25 μm.

In some possible implementation manners, the circuit board is a T-shaped flexible circuit board, a plurality of capacitors are disposed on the T-shaped flexible circuit board, and the plurality of capacitors are correspondingly connected to the at least one fingerprint sensor chip.

In a second aspect, provided is an electronic device, including:

a display screen and the fingerprint identification apparatus in the first aspect, where the fingerprint identification apparatus is disposed under the display screen to implement under-screen fingerprint detection.

In some possible implementation manners, the display screen includes:

a display component; and a light blocking layer, where the light blocking layer is disposed under the display component, the light blocking layer is provided with an opening window through which the fingerprint identification apparatus receives an optical signal emitted by the display component and reflected via a human finger, and the optical signal is used for fingerprint identification;

where the fingerprint identification apparatus is in contact with a lower surface of the display component, or there is a gap between the fingerprint identification apparatus and a lower surface of the display component.

In some possible implementation manners, the electronic device further includes:

a middle frame, where the middle frame is configured to support the display screen;

where an upper surface of the middle frame extends downward to from a groove, and the fingerprint identification apparatus is disposed in the groove and has a predetermined gap with the display screen.

In some possible implementation manners, a support plate of the fingerprint identification apparatus has at least one positioning hole, and at least one positioning post corresponding to the at least one positioning hole of the fingerprint identification apparatus is disposed in the groove.

In some possible implementation manners, a shape of a cross section of each of the at least one positioning post is circular.

In some possible implementation manners, the electronic device further includes:

at least one foam, where the at least one foam is disposed between a support plate and a middle frame.

In some possible implementation manners, a thickness of each of the at least one foam is related to a distance between the middle frame and the display screen and a distance between at least one fingerprint sensor chip in the fingerprint identification apparatus and the display screen.

In some possible implementation manners, a relationship between the at least one foam and the at least one fingerprint sensor chip is a one-to-one correspondence relationship Based on the foregoing technical solutions, after the at least one fingerprint sensor chip is fixedly mounted to a support plate, the support plate may be directly fixedly mounted to an internal component of an electronic device, such as a middle frame, which could reduce mounting difficulty and complexity of the at least one fingerprint sensor chip, and improve maintainability.

In addition, in a scenario that the at least one fingerprint sensor chip includes a plurality of chips, the plurality of chips may be fixedly mounted under a display screen at one time, which could reduce mounting complexity and improve mounting efficiency.

DESCRIPTION OF EMBODIMENTS

The technical solutions in embodiments of the present application will be described hereinafter with reference to the accompanying drawings.

The technical solutions of the embodiments of the present application may be applied to various electronic devices.

For example, portable or mobile computing devices such as smartphones, laptops, tablets and gaming devices, and other electronic devices such as electronic databases, automobiles and bank automated teller machines (ATM), which are not limited in the embodiments of the present application.

The technical solutions of the embodiments of the present application may be applied to a biometric identification technology. The biometric identification technology includes, but is not limited to, identification technologies, such as fingerprint identification, palm print identification, iris identification, human face identification and living body identification. For convenience of illustration, a fingerprint identification technology is described below as an example.

The technical solutions of the embodiments of the present application may be used for an under-screen fingerprint identification technology and an in-screen fingerprint identification technology.

The under-screen fingerprint identification technology refers to mounting a fingerprint identification module under a display screen, so as to realize a fingerprint identification operation in a display region of the display screen without setting a fingerprint capturing region in a region other than the display region on a front face of an electronic device. Specifically, the fingerprint identification module uses light returned from a top surface of a display component of the electronic device for fingerprint sensing and other sensing operations. This returned light carries information about an object (for example, a finger) that is in contact with the top surface of the display component, and the fingerprint identification module located under the display component implements under-screen fingerprint identification by capturing and detecting this returned light. The fingerprint identification module may be designed to achieve desired optical imaging by properly configuring an optical element for capturing and detecting returned light.

Correspondingly, the in-screen (In-display) fingerprint identification technology refers to mounting a fingerprint identification module or a part of a fingerprint identification module inside a display screen, so as to realize a fingerprint identification operation in a display region of the display screen without setting a fingerprint capturing region in a region other than the display region on a front face of an electronic device.

Figure 1:
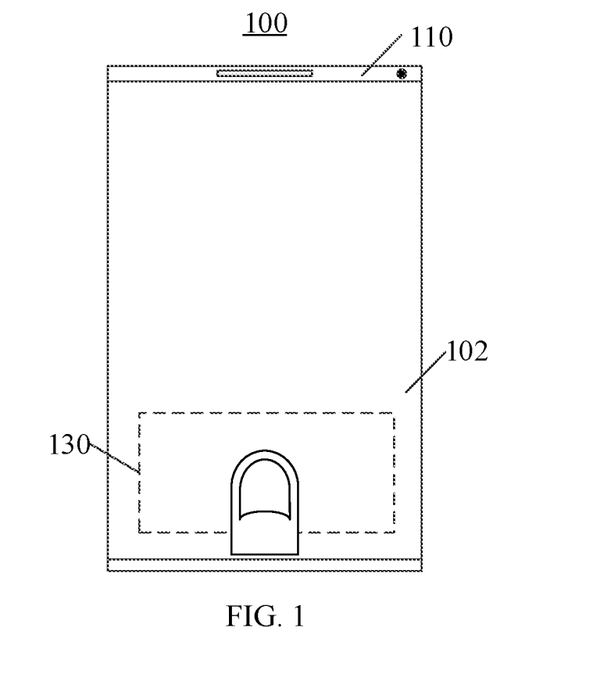
FIG. 1 is a schematic plan view of an electronic device to which the present application is applicable.
Figure 2:
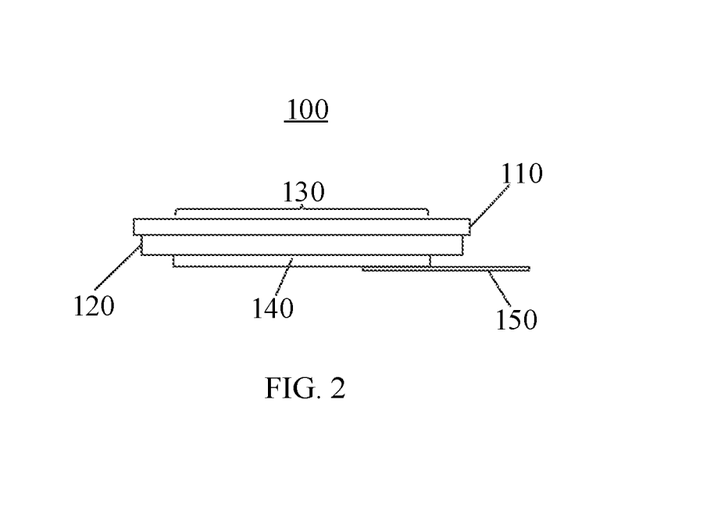
FIG. 2 is a schematic side cross-sectional view of the electronic device shown in FIG. 1.

FIGS. 1 and 2 are schematic views showing an electronic device 100 applicable to an under-screen fingerprint identification technology. FIG. 1 is a schematic front view of an electronic device 100, and FIG. 2 is a schematic partial cross-sectional structural view of the electronic device 100 shown in FIG. 1.

As shown in FIG. 1 and FIG. 2, the electronic device 100 may include a display screen 120 and a fingerprint identification module 140.

The display screen 120 may be a self-light-emitting display screen that adopts a self-light-emitting display unit as a display pixel. For example, the display screen 120 may be an organic light-emitting diode (OLED) display screen or a micro light-emitting diode (micro-LED) display screen. In other alternative embodiments, the display screen 120 may also be a liquid crystal display (LCD) screen or other passive light-emitting display screens, which is not limited in the embodiments of the present application.

In addition, the display screen 120 may specifically be a touch display screen, which may not only display an image, but also detect a touch or press operation of a user, thereby providing the user with a human-machine interaction interface. For example, in an embodiment, the electronic device 100 may include a touch sensor, and the touch sensor may specifically be a touch panel (TP), which may be disposed on a surface of the display screen 120, or may be partially integrated or entirely integrated into an interior of the display screen 120 to form the touch display screen.

The fingerprint identification module 140 may be an optical fingerprint identification module, for example, an optical fingerprint sensor.

Specifically, the fingerprint identification module 140 may include a fingerprint sensor chip (hereinafter also referred to as an optical fingerprint sensor) having an optical sensing array. The optical sensing array includes a plurality of optical sensing units, and each of the optical sensing units may specifically include a photo detector or a photoelectric sensor. In other words, the fingerprint identification module 140 may include a photo detector array (or referred to as a photoelectric detector array, a photoelectric sensor array) including a plurality of photo detectors distributed in an array.

As shown in FIG. 1, the fingerprint identification module 140 may be disposed in a partial region under the display screen 120 such that a fingerprint capturing region (or detecting region) 130 of the fingerprint identification module 140 is at least partially located in a display region 102 of the display screen 120.

Certainly, in other alternative embodiments, the fingerprint identification module 140 may also be disposed at other positions, such as a side of the display screen 120 or a non-light-transmitting region of an edge of the electronic device 100. In this case, an optical signal from at least part of the display region of the display screen 120 may be guided to the fingerprint identification module 140 by using an optical path design, so that the fingerprint capturing region 130 is actually located in the display region of the display screen 120.

In some embodiments of the present application, the fingerprint identification module 140 may include only one fingerprint sensor chip, and in this case, the fingerprint capturing region 130 of the fingerprint identification module 140 has a smaller area and a fixed position, therefore, when performing fingerprint inputting, a user needs to press a finger at a specific position of the fingerprint capturing region 130, otherwise the fingerprint identification module 140 may not be able to capture a fingerprint image, thereby resulting in poor user experience.

In other embodiments of the present application, the fingerprint identification module 140 may specifically include a plurality of fingerprint sensor chips; and the plurality of fingerprint sensor chips may be disposed under the display screen 120 side by side by means of splicing, and sensing regions of the plurality of fingerprint sensor chips collectively form the fingerprint capturing region 130 of the fingerprint identification module 140. That is, the fingerprint capturing region 130 of the fingerprint identification module 140 may include a plurality of sub-regions, and each sub-region corresponds to a sensing region of one of the fingerprint sensor chips, so that the fingerprint capturing region 130 of the fingerprint identification module 140 may be extended to a main region of a lower half of the display screen, that is, it is extended to a region against which the finger is usually pressed, thereby achieving a blind pressing type of a fingerprint input operation. Alternatively, when the number of the fingerprint sensor chips is sufficient, the fingerprint detecting region 130 may also be extended to a half of the display region or even the entire display region, thereby achieving half-screen or full-screen fingerprint detection.

It should be understood that the specific form of the plurality of fingerprint sensor chips is not limited in the embodiment of the present application.

For example, the plurality of fingerprint sensor chips may be respectively fingerprint sensor die encapsulated individually, or may be a plurality of dies encapsulated in a same chip capsule.

For another example, the plurality of fingerprint sensor chips may also be fabricated and formed in different regions of a same die by a semiconductor process.

As shown in FIG. 2, a region where the optical sensing array of the fingerprint identification module 140 is located or a light sensing range of the optical sensing array of the fingerprint identification module 140 corresponds to the fingerprint capturing region 130 of the fingerprint identification module 140. An area of the fingerprint capturing region 130 of the fingerprint identification module 140 may be equal to or not equal to an area of the region where the optical sensing array of the fingerprint identification module 140 is located or the optical sensing range of the optical sensing array of the fingerprint identification module 140, which is not specifically limited in the embodiment of the present application.

For example, by an optical path design of light collimation, the area of the fingerprint capturing region 130 of the fingerprint identification module 140 may be designed to be substantially consistent with an area of the sensing array of the fingerprint identification module 140.

For another example, by an optical path design of converging light or an optical path design of reflecting light, the area of the fingerprint capturing region 130 of the fingerprint identification module 140 may be larger than an area of the sensing array of the fingerprint identification module 140.

An optical path design of the fingerprint identification module 140 is exemplarily described below.

In an example that the optical path design of the fingerprint identification module 140 adopts an optical collimator having an array of through holes with a high aspect ratio, the optical collimator may specifically be a collimator layer fabricated on a semiconductor silicon wafer, which has a plurality of collimating units or micro-holes, and a collimating unit may specifically be a small hole. Light in reflected light reflected back from a finger that is vertically incident to the collimating unit may pass through the collimating unit and be received by a fingerprint sensor chip under the collimating unit. However, light with an excessive large incident angle is attenuated through multiple reflection inside the collimating unit, therefore, each fingerprint sensor chip may basically only receive reflected light reflected back from a fingerprint pattern right above the fingerprint sensor chip, which could effectively improve image resolution and then improve a fingerprint identification effect.

Further, when the fingerprint identification module 140 includes a plurality of fingerprint sensor chips, one collimating unit may be configured for one optical sensing unit in an optical sensing array of each fingerprint sensor chip, and is disposed above a corresponding optical sensing unit by means of attachment. Certainly, the plurality of optical sensing units may also share one collimating unit, that is, the one collimating unit has a sufficiently large aperture to cover the plurality of optical sensing units. Since one collimating unit may correspond to the plurality of optical sensing units and a correspondence between a spatial period of the display screen 120 and a spatial period of the fingerprint sensor chips is broken, even if a spatial structure of a light-emitting display array of the display screen 120 and a spatial structure of the optical sensing array of the fingerprint sensor chip are similar, it could be effectively avoided that the fingerprint identification module 140 uses an optical signal passing through the display screen 120 to perform fingerprint imaging to generate Moire fringes, and the fingerprint identification effect of the fingerprint identification module 140 is effectively improved.

In an example that the optical path design of the fingerprint identification module 140 adopts an optical path design of an optical lens, the optical lens may include an optical lens layer having one or more lens units, for example, a lens group composed of one or more aspheric lenses, for converging reflected light reflected back from a finger to a sensing array of a fingerprint sensor chip under the optical lens layer, so that the sensing array may perform imaging based on the reflected light so as to obtain a fingerprint image of the finger. The optical lens layer may further be provided with a pinhole in an optical path of the lens unit, and the pinhole may cooperate with the optical lens layer to expand the field of view of the fingerprint identification module 140 to improve the fingerprint imaging effect of the fingerprint identification module 140.

Further, when the fingerprint identification module 140 includes a plurality of fingerprint sensor chips, one optical lens may be configured for each of the fingerprint sensor chips for fingerprint imaging, or one optical lens may be configured for the plurality of fingerprint sensor chips to realize light convergence and fingerprint imaging. Even when one fingerprint sensor chip has dual sensing arrays (Dual-Array) or multiple sensing arrays (Multi-Array), two or more optical lenses may be configured for this fingerprint sensor chip to cooperate with the dual sensing arrays or the multiple sensing arrays for optical imaging, so as to reduce an imaging distance and enhance the imaging effect.

In an example that the optical path design of the fingerprint identification module 140 adopts an optical path design of a micro-lens layer, the micro-lens layer may have a micro-lens array formed by a plurality of micro-lenses, which may be provided above a sensing array of a fingerprint sensor chip by a semiconductor growth process or other processes, and each micro-lens may correspond to one of sensing units in the sensing array. Another optical film layer such as a medium layer or a passivation layer may be formed between the micro-lens layer and the sensing units, and more specifically, a light shielding layer having a micro-hole may also be provided between the micro-lens layer and the sensing units, where the micro-hole is formed between a corresponding micro-lens and a corresponding sensing unit, and the light shielding layer may shield optical interference between adjacent micro-lenses and the sensing units such that light is converged to an interior of the micro-hole through the micro-lens and transmitted to a sensing unit corresponding to the micro-lens via the micro-hole for optical fingerprint imaging.

It should be understood that the several implementations of the foregoing optical path directing structure may be used alone or in combination, for example, a micro-lens layer may be further disposed under the collimator layer or the optical lens layer. Certainly, when the collimator layer or the optical lens layer is used in combination with the micro-lens layer, the specific laminated structure or optical path may require to be adjusted according to actual needs.

The fingerprint identification module 140 may be used for capturing fingerprint information (such as fingerprint image information) of a user.

In an example that the display screen 120 adopts an OLED display screen, the display screen 120 may adopt a display screen with a self-light-emitting display unit, for example, an organic light-emitting diode (OLED) display screen or a micro light-emitting diode (Micro-LED) display screen. The fingerprint identification module 140 may use a display unit (that is, an OLED light source) of the OLED display screen that is located in the fingerprint capturing region 130 as an excitation light source for optical fingerprint detection.

When a finger touches, is pressed against or approaches (collectively referred to as pressing for convenience of description) the fingerprint capturing region 130, the display screen 120 emits a beam of light to a finger above the fingerprint capturing region 130, and the beam of light is reflected by a surface of the finger to form reflected light or is scattered inside the finger to form scattered light. In related patent applications, the foregoing reflected light and scattered light are collectively referred to as reflected light for convenience of description. Since a ridge and a valley of a fingerprint have different light reflecting capabilities, reflected light from the ridge of the fingerprint and reflected light from the valley of the fingerprint have different light intensities. After passing through the display screen 120, the reflected light is received by the fingerprint sensor chip in the fingerprint identification module 140 and converted into a corresponding electrical signal, that is, a fingerprint detecting signal; and fingerprint image data may be obtained based on the fingerprint detecting signal, and fingerprint matching verification may be further performed, thereby implementing an optical fingerprint identification function at the electronic device 100.

Therefore, when a user needs to perform fingerprint unlocking or other fingerprint verification on the electronic device 100, an input operation of fingerprint characteristics can be implemented merely by pressing a finger on the fingerprint capturing region 130 in the display screen 120. Since capturing of the fingerprint characteristics can be implemented inside the display region 102 of the display screen 120, a front face of the electronic device 100 in the above structure does not need to specially reserve space to set a fingerprint button (such as a Home button), so that it is possible that a full screen solution can be adopted. Therefore, the display region 102 of the display screen 120 could be substantially extended to the whole front face of the electronic device 100.

Certainly, in other alternative solutions, the fingerprint identification module 140 may also provide an optical signal for fingerprint detection and identification by adopting an internal light source or an external light source. In this case, the fingerprint identification module 140 can not only apply to a self-light-emitting display screen such as an OLED display screen, but also apply to a non-self-light-emitting display screen such as a liquid crystal display screen or another passive light-emitting display screen.

In an example of a liquid crystal display screen having a backlight module and a liquid crystal panel, in order to support under-screen fingerprint detection of the liquid crystal display screen, an optical fingerprint system of the electronic device 100 may further include an excitation light source for optical fingerprint detection. The excitation light source may specifically be an infrared light source or a light source of non-visible light at a specific wavelength, which may be disposed under the backlight module of the liquid crystal display screen or disposed in an edge region under a protective cover of the electronic device 100. The fingerprint identification module 140 may be disposed under the liquid crystal panel or the edge region of the protective cover, and by being directed over an optical path, light for fingerprint detection may reach the fingerprint identification module 140. Alternatively, the fingerprint identification module 140 may also be disposed under the backlight module, and the backlight module allows the light for fingerprint detection to pass through the liquid crystal panel and the backlight module and reach the fingerprint identification module 140 by providing a hole on film layers such as a diffusion sheet, a brightening sheet, a reflection sheet or the like, or by performing other optical designs. When the fingerprint identification module 140 provides an optical signal for fingerprint detection by adopting an internal light source or an external light source, a detection principle may be the same.

As shown in FIG. 1, the electronic device 100 may further include a protective cover 110.

The cover 110 may specifically be a transparent cover such as a glass cover or a sapphire cover which is located on the display screen 120 and covers a front face of the electronic device 100, and a surface of the cover 110 may also be provided with a protective layer. Therefore, in an embodiment of the present application, the so-called finger being pressed against the display screen 120 may actually refer to the finger being pressed against the cover 110 on the display screen 120 or a surface of the protective layer covering the cover 110.

As shown in FIG. 1, a circuit board 150 such as a flexible circuit board (Flexible Printed Circuit, FPC) may also be disposed under the fingerprint identification module 140.

The fingerprint identification module 140 may be soldered to the circuit board 150 through a pad, and achieve electrical interconnection and signal transmission with other peripheral circuits or other elements of the electronic device 100 through the circuit board 150. For example, the fingerprint identification module 140 may receive a control signal from a processing unit of the electronic device 100 through the circuit board 150, and may also output the fingerprint detecting signal from the fingerprint identification module 140 to the processing unit, a control unit or the like of the electronic device 100 through the circuit board 150.

In some embodiments, the fingerprint identification apparatus 140 may be directly fixed and attached to a lower surface of the display screen 120.

However, since the display screen 120 is costly and fragile, the display screen 120 is easily damaged when the fingerprint identification module 140 is directly attached to the display screen 120.

In addition, since the fingerprint identification module 140 and the display screen 120 are completely adhered, if the fingerprint identification module 140 is damaged, the display screen 120 is easily damaged when the fingerprint identification module 140 is disassembled.

Moreover, an attaching process of directly attaching the fingerprint identification module 140 to the display screen 120 is also relatively complicated.

Due to the above problems, costs and complexity of the electronic device 100 are greatly increased, and maintainability is low.

The present application provides a fingerprint identification apparatus, which could reduce the costs and the complexity of the electronic device 100 and improve the maintainability.

Figure 3:
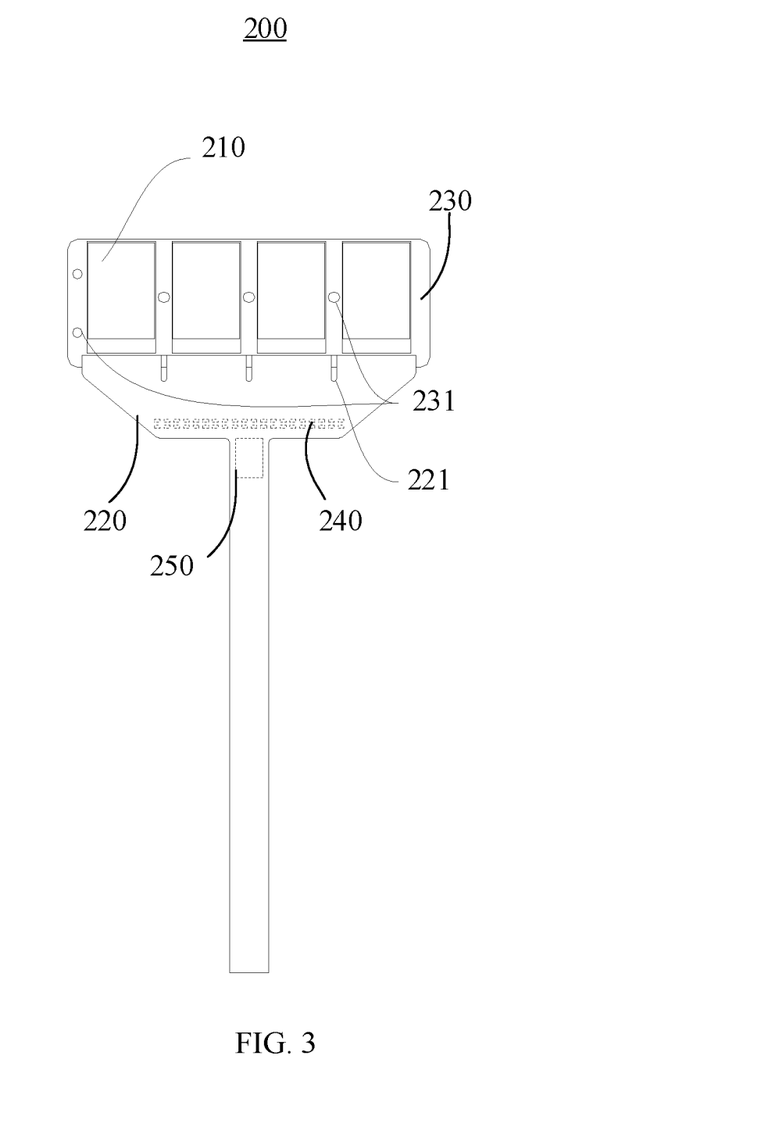
FIG. 3 is a schematic block diagram of a fingerprint identification apparatus according to an embodiment of the present application.
Figure 4:
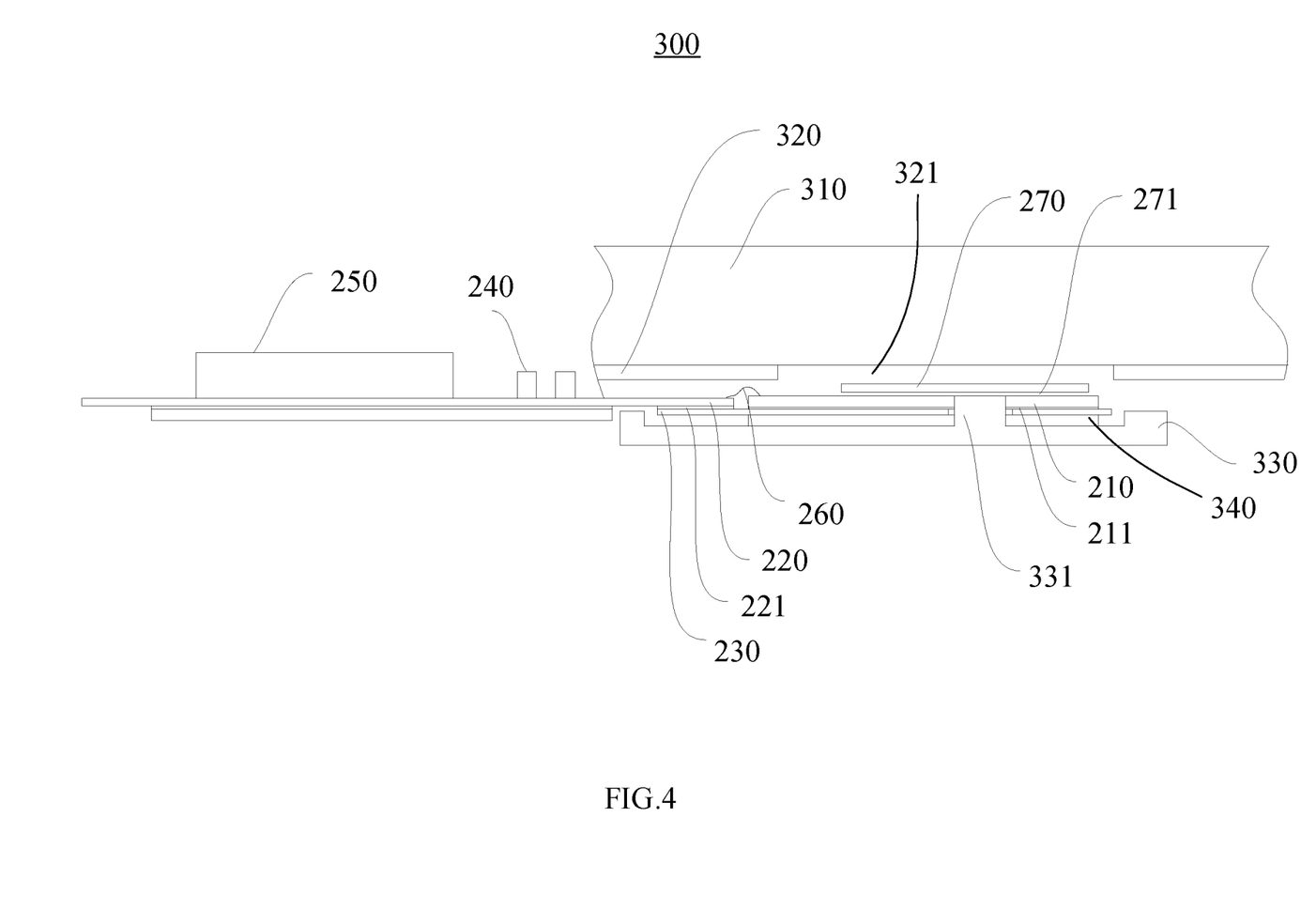
FIG. 4 is a schematic side cross-sectional view of an electronic device having the fingerprint identification apparatus shown in FIG. 3 according to an embodiment of the present application.
Figure 5:
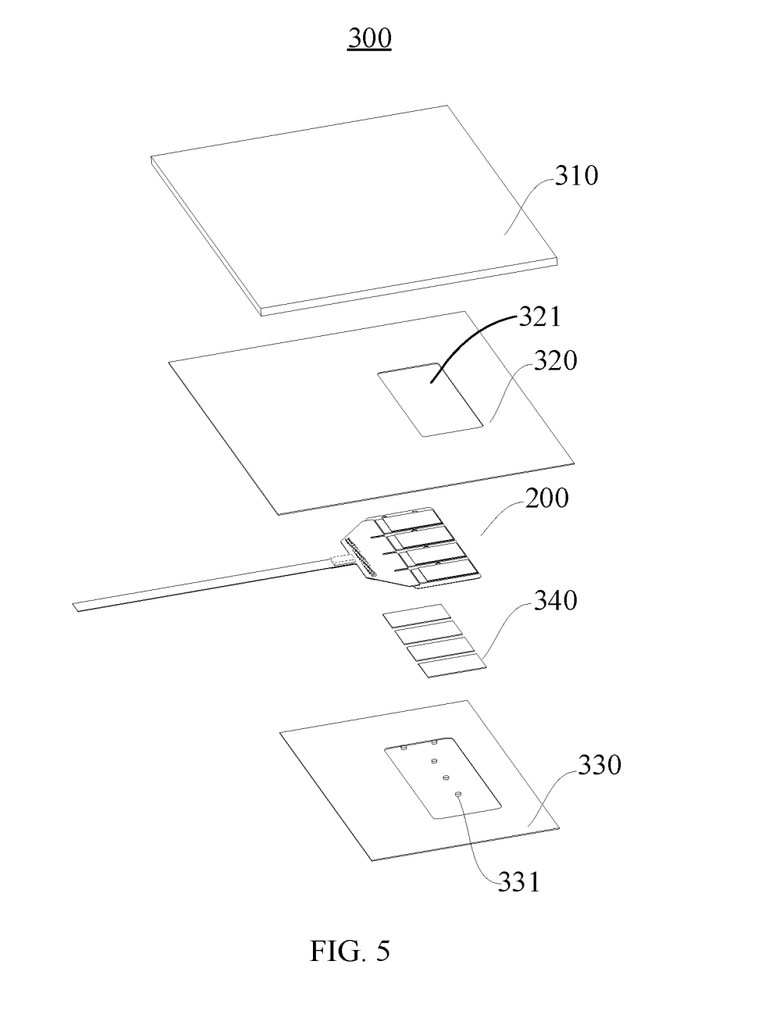
FIG. 5 is a schematic diagram of an electronic device having the fingerprint identification apparatus shown in FIG. 3 after disassembly according to an embodiment of the present application.

FIG. 3 is a schematic block diagram of a fingerprint identification apparatus 200 according to an embodiment of the present application. FIG. 4 is a schematic side cross-sectional view of an electronic device 300 having the fingerprint identification apparatus 200 shown in FIG. 3 according to an embodiment of the present application. FIG. 5 is a schematic diagram of an electronic device 300 having the fingerprint identification apparatus 200 shown in FIG. 3 after disassembly according to an embodiment of the present application.

Hereinafter, the fingerprint identification apparatus 200 and the electronic device 300 according to the embodiments of the present application will be described in detail with reference to FIGS. 3 to 5.

It should be noted that, for convenience of description, in the embodiments of the present application, same reference numerals are used to represent same components, and detailed description of the same components is omitted in different embodiments for the sake of brevity.

As shown in FIG. 3, the fingerprint identification apparatus 200 may include at least one fingerprint sensor chip 210 and a support plate 230.

The at least one fingerprint sensor chip 210 may be disposed on an upper surface of the support plate 230.

For example, the at least one fingerprint sensor chip 210 may be arranged on the upper surface of the support plate side by side to be spliced into an optical fingerprint sensor chip component.

Specifically, as shown in FIG. 4, each of the fingerprint sensor chip 210 may be attached to the upper surface of the support plate 230 by a chip fixing adhesive 211. Optionally, the chip fixing adhesive 211 may be a solid adhesive or liquid glue. For example, the chip fixing adhesive 211 may be a double-sided adhesive or glue.

In the embodiment of the present application, the support plate 230 is configured to be mounted to a middle frame 330 of the electronic device 300 so that each of the fingerprint sensor chips 210 is located under a display screen of the electronic device 300; and each of the fingerprint sensor chips 210 is configured to receive a fingerprint detecting signal returned by reflection or scattering via a human finger on the display screen, where the fingerprint detecting signal is used to detect fingerprint information of the finger. For example, the middle frame 330 of the electronic device 300 is provided with a groove located on an upper surface, and the at least one fingerprint sensor chip 210 is disposed in the groove of the middle frame 330 through the support plate 230.

In the embodiment of the present application, after the at least one fingerprint sensor chip 210 are fixedly mounted to the support plate 230, and the support plate 230 may be directly fixedly mounted to an internal component of the electronic device 300, such as the middle frame, which could reduce mounting difficulty and complexity of the at least one fingerprint sensor chip, and improve maintainability. In addition, for the at least one fingerprint sensor chip 210, the at least one fingerprint sensor chip 210 may be fixedly mounted under the display screen at one time through the support plate 230, which could reduce mounting complexity and improve mounting efficiency.

It should be understood that the fingerprint sensor chips 210 shown in FIG. 3 may be the fingerprint sensor chip in the fingerprint identification apparatus 140 shown in FIG. 1 and FIG. 2. For related functions and structure descriptions, reference may be made to the foregoing related descriptions, and no further details are provided herein for brevity.

Optionally, as shown in FIG. 3, the fingerprint identification apparatus 200 may further include a circuit board 220.

As shown in FIG. 4, at least a part of the circuit board 220 may be attached to the upper surface of the support plate 230 by a circuit board fixing adhesive 221. Optionally, the circuit board fixing adhesive 221 may be a solid adhesive or liquid glue. For example, the circuit board fixing adhesive 221 may be a double-sided adhesive or glue.

Alternatively, the circuit board is disposed between the support plate and the at least one fingerprint sensor chip, and the circuit board and the at least one fingerprint sensor chip are connected.

Further, at least a part of the circuit board 200 may be connected to an edge position of the upper surface of the support plate 230, and the circuit board 220 and the at least one fingerprint sensor chip 210 are connected. For example, the at least a part of the circuit board 220 is connected to the edge position of the upper surface of the support plate 230 that is close to a long side so as to increase an contact area between the circuit board 220 and the support plate 230 and further improve reliability of a connection.

With reference to FIG. 3, the upper surface of the support plate 230 is rectangular, the at least one fingerprint sensor chip 210 are arranged in a row in a region close to a first long side of the support plate 230 in a direction of a long side of the upper surface of the support plate 230, and the circuit board 220 may be fixedly disposed in a region close to a second long side of the support plate 230. The first long side and the second long side are two long sides of the support plate 230, respectively.

Certainly, in other alternative embodiments, the at least one fingerprint sensor chip 210 may be arranged in a direction of a short side of the upper surface of the support plate 230 side by side. In this case, at least a part of the circuit board 220 may be connected to an edge position of the upper surface of the support plate 230 that is close to a long side or a short side. In another embodiment of the present application, the circuit board 220 is disposed between the support plate 230 and the fingerprint sensor chip 210, and the circuit board 220 and the at least one fingerprint sensor chip 210 are connected.

It should be understood that the circuit board 220 shown in FIG. 3 may be the circuit board 150 shown in FIG. 1 and FIG. 2. For related functions and structure descriptions, reference may be made to the foregoing related descriptions, and no further details are provided herein for brevity.

Optionally, a distance between a bottom of the groove and a lower surface of the display screen is greater than a thickness of the fingerprint identification apparatus 200, so as to install the fingerprint identification apparatus 200. For example, the support plate 230 is disposed in the groove by an outline card of the support plate 230 so that the fingerprint identification apparatus 200 is disposed in the groove. The above design can reduce the thickness of the electronic device 300 by means of the mutual cooperation among the structural layers including the display screen and the middle 330 to make the electronic device 300 thin and thin, while also fully ensuring the strength of the fingerprint identification apparatus 200 (such as the installation of a support plate).

Optionally, as shown in FIG. 3, the support plate 230 may be provided with at least one positioning hole.

Further, the at least one positioning hole may correspond to at least one positioning post on any one of components of the electronic device. Therefore, in an assembly process, the fingerprint identification apparatus 200 may be fixedly mounted to the interior of the electronic device only by pressing the at least one positioning post on any one of the components of the electronic device into the at least positioning hole on the support plate 230.

As an embodiment, the support plate 230 may be provided with a first positioning hole in an edge region of a lower surface that is close to a short side. Optionally, the first positioning hole includes two positioning holes, and an opening shape of each positioning hole is circular. Any one of the two positioning holes may penetrate the upper surface and the lower surface of the support plate 230, or may not penetrate the upper surface and the lower surface of the support plate 230. Further, the opening shape of each of the two positioning holes may be the same as a cross-sectional shape of positioning posts on any one of the components of the electronic device that corresponds to the two positioning holes to increase reliability of a connection.

With reference to FIG. 3, the upper surface of the support plate 230 is rectangular, and the support plate 230 may be provided with two positioning holes 231 at edge positions of the left side.

Certainly, a case that the support plate 230 is provided with two positioning holes 231 at the edge positions of the left side is only an example of the present application, and should not be construed as limitation on the present application. For example, in other alternative embodiments, the support plate 230 may be provided with two positioning holes at edge positions of the right side, or the support plate 230 may be provided with one or more than two positioning holes at edge positions where the short side is located, or the support plate 230 may be provided with at least one positioning hole at an edge position of the lower surface that is close to a long side.

As another embodiment, when the support plate 230 is provided with a plurality of optical fingerprint sensor chips in a direction of the long side of the supper surface of the support plate 230, the support plate 230 may be provided with a second positioning hole in an interval region between each pair of adjacent chips of the plurality of optical fingerprint sensor chips. For example, the support plate 230 is provided with the second positioning hole at a middle position of the interval region between each pair of adjacent chips of the plurality of optical fingerprint sensor chips. Optionally, the second positioning hole includes only one positioning hole. An opening shape of the second positioning hole is oblong or elliptical. Further, the opening shape of the second positioning hole is different from a cross-sectional shape of a positioning post on any one of the components of the electronic device that corresponds to the second positioning hole to reduce mounting difficulty. For example, the opening shape of the second positioning hole is oblong or elliptical, and the cross-sectional shape of the positioning post on any one of the components of the electronic device that corresponds to the second positioning hole is circular.

With reference to FIG. 3, the upper surface of the support plate 230 is rectangular, the support surface of the support plate 230 is provided with four fingerprint sensor chips, and the support plate 230 is provided with a positioning hole 231 at a middle position of an interval region between each pair of adjacent fingerprint sensor chips 210 of the at least one fingerprint sensor chip 210, respectively.

Certainly, a case that the support plate 230 is provided with a positioning hole 231 in the interval region between each pair of adjacent chips of the four optical fingerprint sensor chips 210 is only an example of the present application, and should not be construed as limitation on the present application. For example, in other alternative embodiments, the support plate 230 may be provided with a positioning hole in an interval region between at least a pair of specific adjacent chips of the plurality of chips. For example, the support plate 230 is provided with a positioning hole only in an interval region between a pair of middlemost adjacent chips of the plurality of chips.

Optionally, as shown in FIG. 3, the circuit board 220 is provided with at least one bending groove at one end close to the plurality of optical fingerprint sensor chips.

Further, one of the at least one bending groove corresponds to an interval region between a pair of adjacent chips of the plurality of optical fingerprint sensor chips. Therefore, when the support plate 230 is mounted to a certain component of the electronic device, the circuit board 230 may be prevented from affecting performance or even being damaged due to bending. The bending groove is U-shaped to prevent the circuit board from being broken at the position of the bending groove.

Optionally, as shown in FIG. 3, the fingerprint identification apparatus 200 may further include a filter 270, and the filter 270 is disposed above the at least one fingerprint sensor chip.

Optionally, the filter is integrated into the at least one fingerprint sensor chip. For example, the filter is a coating prepared on a surface of at least one sensor chip. Alternatively, the filter is a single structural layer, and the filter is disposed above the at least one sensor chip.

Specifically, the filter 270 may include one or more optical filters; the one or more optical filters can be configured, for example, as bandpass filters to allow transmission of light emitted by OLED pixels while shielding other light components such as IR light in the sunlight. This optical filtering could be effective in reducing background light caused by the sunlight when the fingerprint identification apparatus 200 under the screen is used outdoors. The one or more optical filters can be implemented as, for example, optical filter coatings formed on one or more continuous interfaces or one or more discrete interfaces. It should be understood that the filter 270 can be fabricated on a surface of any optical component or along an optical path to the at least one fingerprint sensor chip from reflected light formed by reflection of a finger.

In the embodiment of the present application, the filter 270 is used to reduce undesired ambient light in fingerprint sensing to improve optical sensing of received light by the at least one fingerprint sensor chip. The filter 270 may be specifically used to reject light at a specific wavelength, such as near infrared light and partial of red light etc. For example, human fingers absorb most of energy of light at a wavelength below 580 nm, and if one or more optical filters or optical filtering layers are designed to reject light at a wavelength from 580 nm to infrared, the impact of the ambient light on the optical detection in fingerprint sensing may be greatly reduced.

In addition, a light incident face of the filter 270 may be further provided with an optical inorganic plating film or an organic blackening coating such that reflectance of the light incident face of the filter 270 is lower than a first threshold, for example, 1%, thereby ensuring that the at least one fingerprint sensor chip can receive sufficient optical signals so as to improve a fingerprint identification effect.

In the embodiment of the present application, the filter 270 and the at least one fingerprint sensor chip are fixed by means of dispensing in a non-photosensitive region of the at least one fingerprint sensor chip, and there is a gap between the filter 270 and a photosensitive region of the at least one fingerprint sensor chip; or a lower surface of the filter 270 is fixed on the upper surface of the at least one fingerprint sensor chip by glue having a refractive index lower than a preset refractive index. For example, the lower surface of the filter 270 is fixed on the upper surface of the at least one fingerprint sensor chip by glue having a refractive index lower than 1.3.

Optionally, as shown in FIG. 3 and FIG. 4, the fingerprint identification apparatus 200 may further include a gold wire 260, and the circuit board 220 is connected to the least one fingerprint sensor chip by the gold wire 260.

Specifically, the gold wire 260 is used to achieve communication between the at least one fingerprint sensor chip and the circuit board 220, and achieve electrical interconnection and signal transmission with other peripheral circuits or other elements of the electronic device as shown in FIG. 1 or FIG. 2 through the circuit board 220. For example, the at least one fingerprint sensor chip may receive a control signal from a processing unit of the electronic device through the gold wire 260, and may also output the fingerprint detecting signal (such as a fingerprint image) to an image processor of the fingerprint identification apparatus 200 or a processor of the electronic device 300 through the gold wire 260.

Further, a height of the gold wire 260 and a height of a sealing adhesive of the gold wire 260 are lower than a height of the filter 270, respectively, so as to reduce a thickness and mounting difficulty of the fingerprint identification apparatus 200.

Optionally, as shown in FIG. 3 and FIG. 4, the fingerprint identification apparatus 200 may further include an image processor 250, and the image processor 250 is disposed on the circuit board 220. The image processor 250 may specifically be a microprocessor (Micro Processing Unit, MCU), and the image processor 250 is configured to receive a fingerprint detecting signal (for example, a fingerprint image) transmitted from the at least one fingerprint sensor chip through the circuit board 220, and perform fingerprint identification based on the fingerprint detecting signal. Specifically, the at least one fingerprint sensor chip first receives reflected light reflected from the user finger and performs imaging based on the received optical signal to generate a fingerprint image; then, the fingerprint image is transmitted to the image processor 250 through the circuit board 220 so that the image processor 250 performs image processing to obtain a fingerprint signal; and finally, fingerprint identification is performed on the fingerprint signal through an algorithm.

Optionally, as shown in FIG. 3 and FIG. 4, the fingerprint identification apparatus 200 may further include at least one capacitor 240, and the at least one capacitor 240 is disposed on the circuit board 220 and configured to optimize the fingerprint detecting signal captured by the at least one fingerprint sensor chip. For example, the at least one capacitor 240 is configured to perform filtering processing on the fingerprint detecting signal captured by the at least one fingerprint sensor chip. Each of the at least one fingerprint sensor chip may correspond to one or more capacitors 240.

It should be understood that FIG. 3 and FIG. 4 are only an example of the present application, and should not be construed as limitation on the present application.

For example, in other alternative embodiments, the fingerprint identification apparatus 200 may include only less than or more than four fingerprint sensor chips.

It should also be understood that parameters of the support plate 230, such as material, shape and size, are not specifically limited in the embodiment of the present application.

For example, a thickness of the support plate 230 ranges from 0.075 mm to 0.30 mm to control a thickness of the fingerprint identification apparatus 200.

For another example, when the support plate 230 is a flexible stiffening plate, the flexible stiffening plate include, but is not limited to, a polyimide stiffening plate to improve heat dissipation performance of the fingerprint identification apparatus 200.

For another example, surface roughness (Ra) of the support plate 230 is greater than a certain threshold, such as 0.25 μm, to improve the imaging effect. Specifically, when the surface roughness of the support plate 230 is greater than a certain threshold, the surface of the support plate 230 may scatter optical signals, which could effectively reduce optical signals that are emitted from the display screen and reflected inside the fingerprint identification apparatus 200, thereby avoiding the influence of light reflection on imaging. In addition, when the surface roughness of the support plate 230 is greater than a certain threshold, reliability of connections between the support plate 230 and other components could be increased, for example, the reliability of the connections between the support plate 230 and the at least one fingerprint sensor chip 210 and the circuit board 220, and the reliability of the connection between the support plate 230 and a component for fixing the support plate 230.

For another example, the color of the support plate 230 is dark to increase a light absorption effect of the support plate 230, thereby preventing interference of light reflected upwardly from the support plate 230 to light received by the at least one fingerprint sensor chip. For example, black or dark brown.

For another example, the lower surface of the support plate 230 is square or rectangular so that the support plate 230 is mounted in the interior of the electronic device 300.

It should also be understood that parameters of the circuit board 220, such as type and shape, are not limited in the embodiment of the present application. Optionally, the circuit board may has an irregular shape or a regular shape. For example, a rectangle or a square.

For example, as shown in FIG. 3, the circuit board 220 is T-shaped.

For another example, in other alternative embodiments, the circuit board 220 may also be a T-shaped deformation structure.

An embodiment of the present application further provides an electronic device 300, and the electronic device 300 may include the fingerprint identification apparatus 200 in the foregoing various embodiments of the present application and a display screen, where the fingerprint identification 200 is disposed under the display screen and configured to receive an optical signal that is reflected by a finger and passes through the display screen for fingerprint detection.

Specifically, the fingerprint identification module 200 may be fixed to an internal component of the electronic device, such as a middle frame through a support plate 230, so that the fingerprint identification apparatus 200 may be fixed under the display screen of the electronic device. For example, the fingerprint identification apparatus 200 may be disposed under the display screen of the electronic device through the support plate 230, and may be specifically disposed under a middle region of the display screen, which is in line with use habits of a user and convenient for holding by the user.

As shown in FIG. 4 and FIG. 5, the electronic device 300 may include a display screen and the fingerprint identification apparatus 200. The display screen may include a display component 310 and a light blocking layer 320 of the display component 310. Optionally, the light blocking layer 320 may be provided with an opening window 321 through which the fingerprint identification apparatus 200 receives an optical signal emitted by the display component 310 and reflected via a human finger, and the optical signal is used for fingerprint identification.

In the embodiment of the present application, the fingerprint identification apparatus 200 of the electronic device 300 and the display screen of the electronic device 300 are designed separately, and a relative distance between the fingerprint identification apparatus 200 and the display screen of the electronic device is not limited in the present application.

Specifically, the fingerprint identification apparatus 200 may be in contact with a lower surface of the display component 310, or there may be a gap between an upper surface of the fingerprint identification apparatus 200 and a lower surface of the display component 310. For example, a distance between the upper surface of the fingerprint identification apparatus 200 and a lower surface of the display screen may be less than or equal to a specific threshold, such as 600 μm, so as to ensure that there are sufficient optical signals incident to a photosensitive region of at least one fingerprint sensor chip.

In the embodiment of the present application, if the fingerprint identification apparatus 200 is not in contact with the lower surface of the display screen, a fixed gap is reserved therebetween, and the gap may be an air gap that is not filled with any auxiliary material, which could ensure that the fingerprint identification apparatus 200 would not touch the lower surface of the display screen when the display screen is pressed or the electronic device is dropped or collided, and stability and performance of fingerprint identification of the fingerprint identification apparatus 200 are not affected.

It should be understood that, for the display component 310 shown in FIG. 4 and FIG. 5, reference may be made to the foregoing description of the display screen 120, and no further details are provided herein for brevity.

It should be understood that the light blocking layer 320 may also be used as a heat dissipation layer and/or a cushion layer, where the light blocking layer is used to block other regions other than the fingerprint detecting region to prevent optical signals in the other regions from entering the fingerprint sensor chip to affect the fingerprint detection effect. When the light blocking layer 320 is used as a heat dissipation layer, it may also be used to dissipate heat generated by a light-emitting unit in the display screen. When the light blocking layer 320 is used as a cushion layer, it may be used to cushion squeeze or collision on the electronic device to reduce damage to the display screen.

For example, the light-shielding layer 320 can be used as an auxiliary structure of the display component 310. It has a certain thickness and can include multiple layer structures with an opening window formed thereon. In other word, the light blocking layer further comprises at least one structural layer, and the opening window penetrates the at least one structural layer. For example, the at least one structural layer comprises a heat dissipation layer and/or a cushion layer.

Optionally, a distance between a bottom of the groove of a middle frame of the electronic device and a lower surface of the display component is greater than a thickness of the fingerprint identification apparatus, and the space formed by the groove and the opening window is configured to accommodate the fingerprint identification apparatus.

Optionally, as shown in FIG. 4 and FIG. 5, the electronic device 300 may further include a middle frame 330, and the middle frame 330 is configured to support the display screen. Specifically, the middle frame 330 may be a frame of the electronic device 300 that is disposed between the display screen and a battery and is used for carrying various components therein, and the various components therein include, but are not limited to, a main board, a camera, a flex cable, various sensors, a microphone, an earphone, or the like.

It can be understood that the embodiment of the present application is described merely by an example that the fingerprint identification apparatus 200 is fixed to the middle frame 330. In other alternative embodiments, the fingerprint identification 200 may be fixedly connected to another structure of the electronic device 300 that has a support function to implement that the fingerprint identification apparatus 200 is mounted under the display screen. Just ensure that the foregoing fingerprint identification apparatus 200 could be fixedly disposed under the display screen in a separation manner.

For example, the fingerprint identification apparatus 200 may be fixed to a structure or device of the electronic device that has a support function, such as a back cover, a main board or a battery, so as to be further fixedly disposed under the display screen.

Optionally, as shown in FIG. 4 and FIG. 5, an upper surface of the middle frame 330 extends downward to from a groove, and at least one positioning post 331 corresponding to at least one positioning hole of the fingerprint identification apparatus 200 is disposed in the groove. A shape of a cross section of each of the at least one positioning post 331 may be circular.

Optionally, as shown in FIG. 4 and FIG. 5, the electronic device 300 may further include at least one foam 340, and the at least one foam 340 is disposed between the support plate 230 and the middle frame 330. Part of or all of the at least one foam is a double-sided adhesive foam to improve reliability of the connection between the support plate 230 and the middle frame 330.

Further, a relationship between the at least one foam 340 and the at least one fingerprint sensor chip 210 in the fingerprint identification apparatus is a one-to-one correspondence relationship.

With reference to FIG. 5, when the fingerprint identification apparatus 200 includes four fingerprint sensor chips, and the electronic device 300 may include four foams corresponding to the four fingerprint sensor chips, where a size of a lower surface of each fingerprint sensor chip is the same as a size of an upper surface of a corresponding foam.

Furthermore, a thickness of each of the at least one foam 340 is related to a distance between the middle frame 330 and the display screen and a distance between at least one fingerprint sensor chip 210 in the fingerprint identification apparatus 200 and the display screen (for example, the display component 310). The thickness of each of the at least one foam 340 is inversely proportional to the distance between the middle frame 330 and the display screen and the distance between the at least one fingerprint sensor chip 210 in the fingerprint identification apparatus 220 and the display screen. For example, the thickness of each of the at least one foam 340 makes a distance between the upper surface of the at least one fingerprint sensor chip 210 and the lower surface of the display screen less than or equal to 600 μm.

It should be understood that FIG. 5 is only an example of the present application, and should not be construed as limitation on the present application. For example, in other alternative embodiments, the electronic device 300 may include only one foam, and the one foam is provided with a through hole corresponding to at least one positioning hole on the support plate 230.

It should be understood that specific examples in embodiments of the present application are just for helping those skilled in the art better understand the embodiments of the present application, rather than for limiting the scope of the present application.

It should be understood that terms used in embodiments of the present application and the claims appended hereto are merely for the purpose of describing particular embodiments, and are not intended to limit the embodiments of the present application. For example, the use of a singular form of "a", "the above" and "said" in the embodiment of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are performed by hardware or software depends on particular applications and designed constraint conditions of the technical solutions. Persons skilled in the art may use different methods to implement the described functions for each particular application, but it should not be considered that the implementation goes beyond the scope of the present application.

In the several embodiments provided in the present application, it should be understood that, the disclosed system and apparatus may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual coupling or direct coupling or communication connection may be indirect coupling or communication connection through some interfaces, apparatuses or units, and may also be electrical, mechanical, or connection in other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If the integrated unit is implemented in the form of the software functional unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The storage medium includes: various media that may store program codes, such as a U-disk, a removable hard disk, a read-only memory (ROM), a random access memory (RAM), a magnetic disk, a compact disk, and so on.

The foregoing descriptions are merely specific implementations of the present disclosure. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A fingerprint identification apparatus applied to an electronic device having a display screen, wherein the fingerprint identification apparatus comprises:
   a support plate; and
   at least one fingerprint sensor chip, wherein the at least one fingerprint sensor chip is disposed on an upper surface of the support plate;
   wherein a middle frame of the electronic device is provided with a groove located on an upper surface, and the at least one fingerprint sensor chip is disposed in the groove of the middle frame through the support plate so that the at least one fingerprint sensor chip is located under the display screen of the electronic device; and the at least one fingerprint sensor chip is configured to receive a fingerprint detecting signal returned by reflection or scattering via a human finger on the display screen, wherein the fingerprint detecting signal is used to detect fingerprint information of the finger; and
   wherein the fingerprint identification apparatus further comprises:
   a circuit board,
   wherein at least a part of the circuit board is connected to an edge position of the upper surface of the support plate, and the circuit board and the at least one fingerprint sensor chip are connected,
   wherein the circuit board is connected to the at least one fingerprint sensor chip by a gold wire, and a height of the gold wire and a height of a sealing adhesive of the gold wire are lower than a height of a filter, and
   wherein the filter is disposed on the upper surface of the at least one fingerprint sensor chip.

2. The fingerprint identification apparatus according to claim 1, wherein the support plate is a flexible stiffening plate, and the circuit board and the fingerprint sensor chip are arranged side by side on the upper surface of the support plate.

3. The fingerprint identification apparatus according to claim 1, wherein the circuit board is disposed between the support plate and the at least one fingerprint sensor chip.

4. The fingerprint identification apparatus according to claim 1, wherein a distance between a bottom of the groove and a lower surface of the display screen is greater than a thickness of the fingerprint identification apparatus, so as to install the fingerprint identification apparatus.

5. The fingerprint identification apparatus according to claim 1, wherein the at least one fingerprint sensor chip comprises a plurality of optical fingerprint sensor chips, and the plurality of optical fingerprint sensor chips are arranged on the upper surface of the support plate side by side to be spliced into an optical fingerprint sensor chip component.

6. The fingerprint identification apparatus according to claim 5, wherein the circuit board is provided with at least one bending groove at one end close to the plurality of optical fingerprint sensor chips, and one of the at least one bending groove corresponds to an interval region between a pair of adjacent chips of the plurality of optical fingerprint sensor chips.

7. The fingerprint identification apparatus according to claim 1, wherein the fingerprint identification apparatus further comprises:
   a filter, wherein the filter is integrated into the at least one fingerprint sensor chip.

8. The fingerprint identification apparatus according to claim 7, wherein a light incident face of the filter is provided with an optical inorganic plating film or an organic blackening coating.

9. The fingerprint identification apparatus according to claim 1, wherein surface roughness of the support plate is greater than 0.25 µm.

10. The fingerprint identification apparatus according to claim 1, wherein the circuit board is a T-shaped flexible circuit board, a plurality of capacitor are disposed on the T-shaped flexible circuit board, and the plurality of capacitors are correspondingly connected to the at least one fingerprint sensor chip.

11. An electronic device, comprising:
   a display screen and a fingerprint identification apparatus, wherein the fingerprint identification apparatus is disposed under the display screen to implement under-screen fingerprint detection;
   wherein the fingerprint identification apparatus comprises:
   a support plate; and
   at least one fingerprint sensor chip, wherein the at least one fingerprint sensor chip is disposed on an upper surface of the support plate;
   wherein a middle frame of the electronic device is provided with a groove located on an upper surface, and the at least one fingerprint sensor chip is disposed in the groove of the middle frame through the support plate so that the at least one fingerprint sensor chip is located under the display screen of the electronic device; and the at least one fingerprint sensor chip is configured to receive a fingerprint detecting signal returned by reflection or scattering via a human finger on the display screen, wherein the fingerprint detecting signal is used to detect fingerprint information of the finger;

wherein the fingerprint identification apparatus further comprises:

a circuit board, wherein at least a part of the circuit board is connected to an edge position of the upper surface of the support plate, and the circuit board and the at least one fingerprint sensor chip are connected, wherein the circuit board is connected to the at least one fingerprint sensor chip by a gold wire, and a height of the gold wire and a height of a sealing adhesive of the gold wire are lower than a height of a filter, wherein the filter is disposed on the upper surface of the at least one fingerprint sensor chip.

12. The electronic device according to claim 11, wherein the display screen comprises:

a display component; and a light blocking layer, wherein the light blocking layer is disposed under the display component, the light blocking layer is provided with an opening window through which the fingerprint identification apparatus receives an optical signal emitted by the display component and reflected via a human finger, and the optical signal is used for fingerprint identification;

wherein the fingerprint identification apparatus is in contact with a lower surface of the display component, or there is a gap between the fingerprint identification apparatus and a lower surface of the display component.

13. The electronic device according to claim 12, wherein a distance between a bottom of the groove of a middle frame of the electronic device and a lower surface of the display component is greater than a thickness of the fingerprint identification apparatus, and the space formed by the groove and the opening window is configured to accommodate the fingerprint identification apparatus.

14. The electronic device according to claim 12, wherein the light blocking layer is used as a heat dissipation layer and/or a cushion layer.

15. The electronic device according to claim 12, wherein the light blocking layer further comprises at least one structural layer, and the opening window penetrates the at least one structural layer.

16. The electronic device according to claim 15, wherein the at least one structural layer comprises a heat dissipation layer and/or a cushion layer.

17. The electronic device according to claim 11, wherein the electronic device further comprises:

at least one foam, wherein the at least one foam is disposed between the support plate and the middle frame.

18. The electronic device according to claim 17, wherein a thickness of each of the at least one foam is related to a distance between the middle frame and the display screen and a distance between at least one fingerprint sensor chip in the fingerprint identification apparatus and the display screen.

* * * * *